US010165897B2

(12) United States Patent
Kelly

(10) Patent No.: US 10,165,897 B2
(45) Date of Patent: Jan. 1, 2019

(54) FOOD STUFF DISPENSING MACHINE AND DEHYDRATED FOODSTUFF CONTAINER

(71) Applicant: Mega Consultants, LLC, Laurel, DE (US)

(72) Inventor: Edward C. Kelly, Blue Bell, PA (US)

(73) Assignee: Mega Consultants, LLC, Blue Bell, PA (US)

(*) Notice: Subject to any disclaimer, the term of this patent is extended or adjusted under 35 U.S.C. 154(b) by 0 days.

(21) Appl. No.: 15/800,422

(22) Filed: Nov. 1, 2017

(65) Prior Publication Data
US 2018/0064287 A1 Mar. 8, 2018

Related U.S. Application Data

(60) Division of application No. 14/708,843, filed on May 11, 2015, now abandoned, which is a continuation of
(Continued)

(51) Int. Cl.
A47J 37/12 (2006.01)
A47J 31/40 (2006.01)
(Continued)

(52) U.S. Cl.
CPC ........... A47J 37/1271 (2013.01); A23L 19/19 (2016.08); A23P 30/20 (2016.08); A47J 31/405 (2013.01);
(Continued)

(58) Field of Classification Search
CPC .... A47J 31/405; A47J 31/407; A47J 37/1295; A47J 37/1271; B65D 83/0005;
(Continued)

(56) References Cited

U.S. PATENT DOCUMENTS 1,412,388 A * 4/1922 Clermont ........... B65D 85/8043
426/112
2,236,727 A * 4/1941 Dewees ............ B05C 17/00576
222/386
(Continued)

FOREIGN PATENT DOCUMENTS

CN 1095033 A 11/1994
GB 2037719 A 7/1980

OTHER PUBLICATIONS

International Search Report dated Apr. 29, 2009 in Int'l Application No. PCT/US09/35131.
(Continued)

Primary Examiner — Eric Stapleton
(74) Attorney, Agent, or Firm — Panitch Schwarze Belisario & Nadel LLP

(57) ABSTRACT

A stand alone container for housing dehydrated foodstuff and for use in a foodstuff machine has a continuous sidewall with first and second ends forming a storage area. A piston is complementarily positioned within the sidewall proximate the first end and is slidable with respect to the sidewall. The container contains dehydrated foodstuff located in the storage area and a removable cover positioned proximate the second end. The foodstuff machine includes a machine housing having an access opening for receiving the container having dehydrated foodstuff therein. A hydrating and positioning system moves from a loading position when the container is in the access opening to a hydrating position with the container second end above the first end and then to a transfer position where the first end is positioned above the second end. A liquid dispenser is positioned above the container when the container is in the hydrating position. The foodstuff machine has a transfer arm having an operative end for receiving the container and is movable from a first position that supports the container in the transfer (Continued)

position to an extrusion position where the container is located over a cooking station. A piston rod is operatively associated with the piston in the container and moves to force the piston toward the second end of the container to force hydrated foodstuff through the die to form uncooked strips which drop into the cooking station.

6 Claims, 10 Drawing Sheets

Related U.S. Application Data application No. 12/392,785, filed on Feb. 25, 2009, now abandoned.

(60) Provisional application No. 61/073,569, filed on Jun. 18, 2008, provisional application No. 61/031,032, filed on Feb. 25, 2008.

(51) Int. Cl.
  *B65D 65/46* (2006.01)
  *B65D 83/00* (2006.01)
  *A23P 30/20* (2016.01)
  *A23L 19/18* (2016.01)

(52) U.S. Cl.
  CPC ......... *A47J 31/407* (2013.01); *A47J 37/1295* (2013.01); *B65D 65/46* (2013.01); *B65D 83/0005* (2013.01); *A23V 2002/00* (2013.01)

(58) Field of Classification Search
  CPC .......... B65D 65/46; A23L 19/19; A23P 30/20; A23V 2002/00
  USPC .......................................................... 99/357
  See application file for complete search history.

(56) References Cited

U.S. PATENT DOCUMENTS

| | | | | |
|---|---|---|---|---|
| 2,519,271 | A * | 8/1950 | Miller | B65D 83/0005 206/229 |
| 3,302,817 | A * | 2/1967 | Rollins | B65D 79/00 206/0.5 |
| 3,307,736 | A * | 3/1967 | Kaplow | B65D 17/4011 220/231 |
| 3,344,752 | A * | 10/1967 | Ilines | A21C 11/18 425/182 |
| 3,398,041 | A * | 8/1968 | Ferree | B65D 65/18 229/164.1 |
| 3,425,339 | A * | 2/1969 | Rutledge | A23L 3/365 426/511 |
| 3,470,830 | A * | 10/1969 | Reynolds | A21C 11/18 425/192 R |
| 3,503,342 | A * | 3/1970 | Ilines | A21C 11/16 425/192 R |
| 3,611,951 | A * | 10/1971 | Sloan | B30B 11/227 100/288 |
| 3,645,748 | A * | 2/1972 | Ilines | A21C 11/16 426/438 |
| 3,757,533 | A * | 9/1973 | Kent | A23L 3/375 62/303 |
| 3,777,942 | A * | 12/1973 | Fletcher | B64G 1/60 222/309 |
| 3,796,813 | A * | 3/1974 | Kurland | B65D 51/28 206/219 |
| 3,890,453 | A * | 6/1975 | Harmon | A21C 11/10 426/503 |
| 3,892,511 | A * | 7/1975 | Farrant | A21C 11/16 425/382 R |
| 3,937,608 | A * | 2/1976 | Farrant | A21C 11/18 425/159 |
| 3,988,875 | A * | 11/1976 | Fay | A21C 11/10 53/514 |
| 4,056,345 | A * | 11/1977 | Shatila | A21C 11/18 222/386.5 |
| 4,272,556 | A * | 6/1981 | Shatila | A23L 19/13 426/453 |
| 4,356,935 | A * | 11/1982 | Kamin | A47G 19/183 206/384 |
| 4,422,817 | A * | 12/1983 | Little | B65G 49/0459 187/250 |
| 4,438,683 | A * | 3/1984 | Bartfield | A47J 37/1228 221/150 A |
| 4,465,452 | A * | 8/1984 | Masuzawa | A21C 11/18 425/308 |
| 4,488,663 | A * | 12/1984 | Hooper | G01F 11/06 222/309 |
| 4,540,588 | A * | 9/1985 | Bartfield | A47J 37/1228 426/231 |
| 4,646,627 | A * | 3/1987 | Bartfield | A21C 1/00 222/372 |
| 4,694,742 | A * | 9/1987 | Dover | A47J 37/1228 99/404 |
| 4,919,950 | A * | 4/1990 | Mak | A47J 27/14 426/233 |
| 4,954,037 | A * | 9/1990 | Habicht | B65G 65/23 222/166 |
| 5,089,307 | A * | 2/1992 | Ninomiya | A22C 13/0013 106/144.72 |
| 5,195,663 | A * | 3/1993 | Martin | B01F 11/0031 222/327 |
| 5,197,376 | A * | 3/1993 | Bird | A21B 5/00 99/330 |
| 5,307,736 | A * | 5/1994 | Sorensen | A47J 37/1223 99/330 |
| 5,537,915 | A * | 7/1996 | Kelly | A47J 37/1228 99/336 |
| 5,605,091 | A * | 2/1997 | Garber | A47J 37/1228 99/330 |
| 5,901,640 | A * | 5/1999 | Castlebury | A47J 37/1228 99/330 |
| 5,974,951 | A * | 11/1999 | Kovacs | A47J 37/1228 99/333 |
| 6,054,157 | A * | 4/2000 | Shapiro | A21C 3/04 222/325 |
| 6,113,968 | A * | 9/2000 | McGuire | A23L 29/231 426/443 |
| 6,740,345 | B2 * | 5/2004 | Cai | A47J 31/14 426/112 |
| 7,619,188 | B2 * | 11/2009 | Oghafua | A47J 27/004 219/600 |
| 2004/0020368 | A1 * | 2/2004 | Cai | A47J 27/2105 99/279 |
| 2009/0214737 | A1 * | 8/2009 | Kelly | A47J 31/405 426/516 |
| 2016/0051093 | A1 * | 2/2016 | Kelly | A47J 31/405 426/115 |
| 2018/0064287 | A1 * | 3/2018 | Kelly | A47J 31/405 |

OTHER PUBLICATIONS

International Preliminary Report on Patentability dated Aug. 31, 2010 in Int'l Application No. PCT/US09/35131.
"Solan" Aug. 22, 2006, downloaded from web page: http://web.archive.org/web/20060822160035/http://www.solan.pl/potatoflakes-and-granules.html, Download date: Nov. 4, 2014, 2 pages.
"Survival Center Guide." Feb. 3, 2007, downloaded from web page: http://web.archive.org/web/20070203190153/http://www.captaindaves.com/guide/afford.htm, Download date: Apr. 3, 2014, 3 pages.
Office Action dated Apr. 13, 2012 in U.S. Appl. No. 12/392,785 by Kelly.
Office Action dated Jun. 6, 2013 in U.S. Appl. No. 12/392,785 by Kelly.
Office Action dated Apr. 21, 2014 in U.S. Appl. No. 12/392,785 by Kelly.

(56) References Cited

OTHER PUBLICATIONS

Office Action dated Nov. 10, 2014 in U.S. Appl. No. 12/392,785 by Kelly.
Office Action dated Dec. 5, 2016 in U.S. Appl. No. 14/708,843, by Kelly.
Office Action dated Aug. 1, 2017 in U.S. Appl. No. 14/708,843, by Kelly.

* cited by examiner

FOOD STUFF DISPENSING MACHINE AND DEHYDRATED FOODSTUFF CONTAINER

CROSS-REFERENCE TO RELATED APPLICATIONS

This application is a divisional application of U.S. patent application Ser. No. 14/708,843, filed May 11, 2015, entitled "Foodstuff Dispensing Machine and Dehydrated Foodstuff Container," currently pending, which is a continuation application of U.S. patent application Ser. No. 12/392,785, filed Feb. 25, 2009, entitled "Foodstuff Dispensing Machine and Dehydrated Foodstuff Container," now abandoned, which claims priority to U.S. Provisional Patent Application No. 61/031,032, which was filed on Feb. 25, 2008, and to U.S. Provisional Patent Application No. 61/073,569, which was filed on Jun. 18, 2008, the entire contents of all of which are incorporated by reference herein.

BACKGROUND OF THE INVENTION

Convenience stores serve an assortment of prepackaged and freshly cooked foodstuff and are located in shopping malls, gas stations, rest stops, airports and nearly any location where large volumes of people travel, live, work and eat such that people can conveniently buy ready-to-eat foodstuff. However, one of the most popular snack-foods in the world, french fried potatoes comprising strips of potato that are deep fried ("french fries"), are not typically served at convenience stores due to the high cost of purchasing and running a hot oil fryer/cooker system. Such a system often requires an exhaust system, overflow protection or drainage, grease traps, maintenance and cleaning, insurance, and additional employee wages.

Self contained automated machines for cooking french fries are known. One known french fry vending machine stores the potato as dehydrated granules to prevent the foodstuff from perishing. When a user inserts money into the machine and places an order, a portion of the dehydrated granules are released into a chamber. Hot water is then added to the granules in the chamber to form a potato mixture. Extrusion plugs are removed from a die forming the bottom of the chamber and the mixture is then extruded through the die to form potato strips. The potato strips are received into a basket and the basket is moved by a robotic arm into a container of hot cooking oil. Once cooked to form french fries, the french fries are placed into a serving cup and dispensed to the user. Though such a machine effectively provides a vending machine for dispensing freshly cooked french fries, the vending machine is not practically implemented into a convenience store because the machine is much too large to fit into a small and already crowed store or other indoor areas. Further, the machine is expensive due to the automation, currency acceptor and the robust housing needed to prevent vandalism.

Further, it is known to provide a rectangularly-shaped french fry that is symmetrically shaped such that each french fry is cooked evenly therethrough. Cooking time of a potato strip is only reduced by making the potato strip thinner or small in cross section. French fries that are too thin, easily break while cooking or eating or may be undesirable as compared to thicker french fries based on a user's preference.

What is needed, but not provided in the prior art, is a foodstuff dispensing machine that utilizes single-use dehydrated foodstuff containers to reduce the number of automated steps and components required in a foodstuff dispensing machine. Additionally, what is needed is a french fry that is shaped to reduce cooking time but maintains a maximum cross-sectional width and strength. Additionally, a foodstuff dispensing machine is needed that reduces the amount of maintenance required for the foodstuff dispensing machine.

The present invention provides the solutions to the disadvantages described above since it is low-cost, installs in minutes, and is virtually maintenance free.

BRIEF SUMMARY OF THE INVENTION

Briefly stated, the present invention is directed to a stand alone container for housing dehydrated foodstuff and for use in a foodstuff machine. The container has a continuous sidewall having first and second ends forming a storage area. A piston is complementarily positioned within the sidewall proximate the first end and is slidable with respect to the sidewall. Dehydrated foodstuff is located in the storage area and a removable cover is positioned proximate the second end.

In another aspect the present invention is a foodstuff machine for extruding and cooking foodstuff from the container described in the preceding paragraph. The foodstuff machine comprises a machine housing having an access opening for receiving the container having dehydrated foodstuff therein. A hydrating and positioning system moves from a loading position when the container is in the access opening to a hydrating position with the container second end above the first end and then to a transfer position where the first end is positioned above the second end. A liquid dispenser is positioned above the container when the container is in the hydrating position. The foodstuff machine has a transfer arm having an operative end for receiving the container and is movable from a first position that supports the container in the transfer position to an extrusion position where the container is located over a cooking station. A piston rod is operatively associated with the piston in the container and moves to force the piston toward the second end of the container to force hydrated foodstuff through the die to form uncooked strips which drop into the cooking station.

In another aspect the present invention is directed to a method of making extruded and cooked foodstuff. The method includes providing a plurality of containers containing dehydrated foodstuff, selecting a container from the plurality of containers, and removing a removable cover from an outside of the container. The container is then placed inside the housing of the foodstuff machine which is configured to receive the container. A mechanism is then activated to move the container to a hydration position and liquid is added to the dehydrated foodstuff to form a semi-solid mixture in the container. The container is then transferred to an extrusion position and the mixture is urged from the container through a die plate to form extruded strips. The extruded strips are then cooked to form cooked strips. Lastly, the cooked strips are removed from the inside of the housing.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the Drawings.

DETAILED DESCRIPTION OF THE INVENTION

Figure 1:
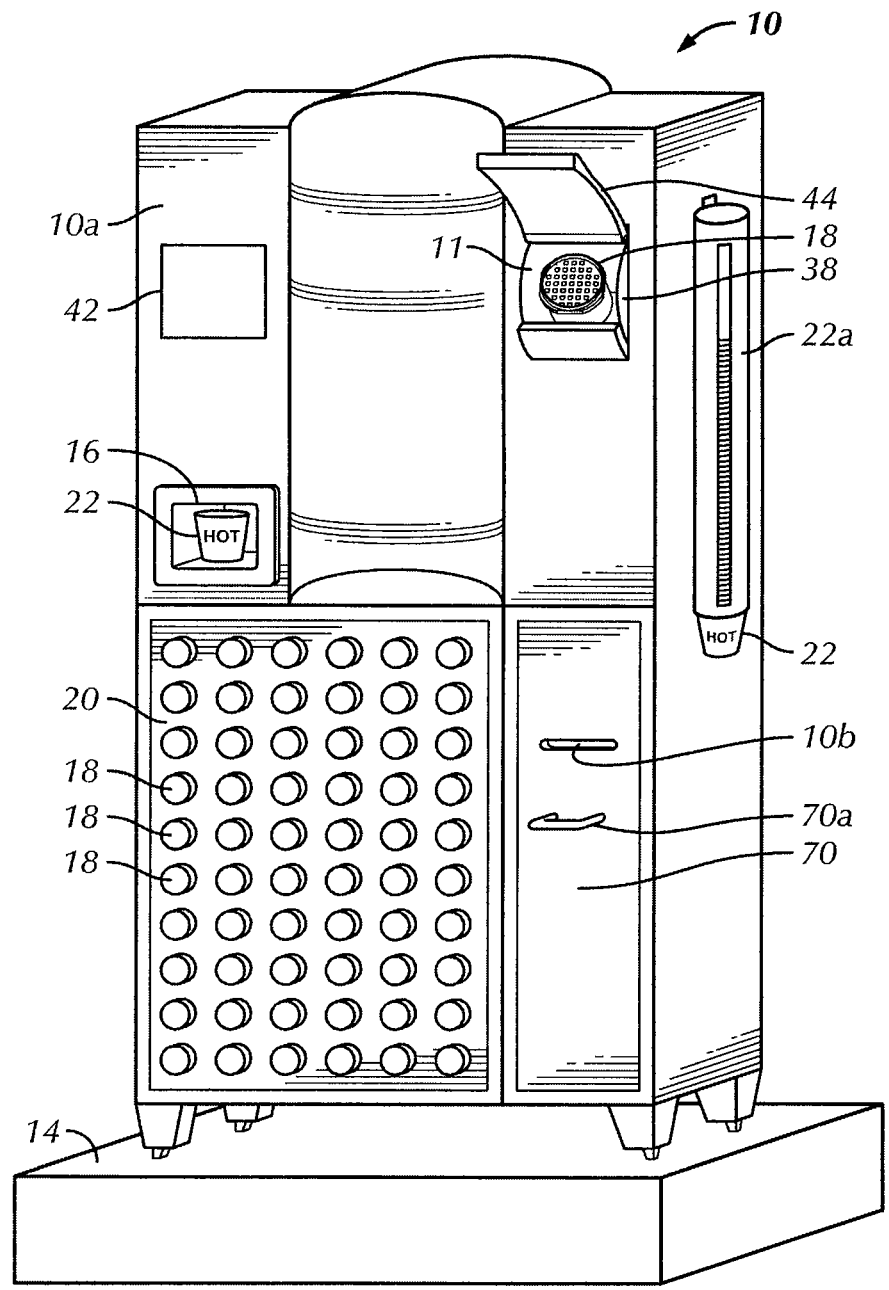
FIG. 1 is a front perspective view of a foodstuff dispensing machine in accordance with the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the foodstuff dispensing machine and dehydrated foodstuff container and designated parts thereof. Unless specifically set forth herein, the terms "a", "an" and "the" are not limited to one element but instead should be read as meaning "at least one". The terminology includes the words noted above, derivatives thereof and words of similar import.

Referring to FIGS. 2-3 and 6A-6F, a first aspect of the present invention is directed to a stand alone container for housing dehydrated foodstuff and for use in a foodstuff machine. The container 18 includes a continuous sidewall 28 having a first end 28a and a second end 28b, forming a storage area 29 as shown in FIGS. 2, 3, and 6A-6F in detail. The sidewall 28 is preferably generally cylindrical in shape. The sidewall 28 is preferably comprised of a transparent polymeric material but the sidewall 28 may be opaque and comprised of any suitable material. The container 18 is preferably 3.00 inches in diameter and 2.312 inches long, although other dimensions can be selected depending on the size and quantity of the foodstuff to be prepared.

Figure 2:
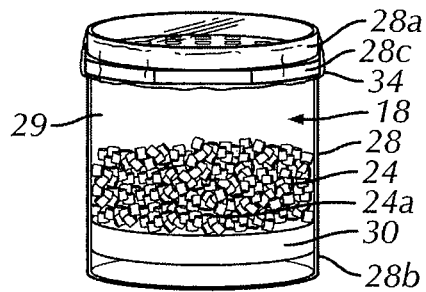
FIG. 2 is a side perspective view of a container used with the machine shown in FIG. 1.
Figure 4:
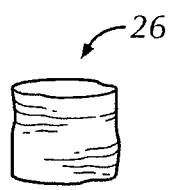
FIG. 4 is an enlarged view of a dehydrated foodstuff granule contained within the container shown in FIG. 2.

The storage area 29 includes pre-determined portion of dehydrated foodstuff 24 (FIG. 2). The dehydrated foodstuff 24 is shipped, stored and displayed in a dehydrated form and is only re-hydrated immediately prior to extrusion as described below such that spoilage is prevented and the containers 18 have an extended shelf life. The dehydrated foodstuff 24 comprises a plurality of potato granules 26 (FIG. 4). The granules 26 can be made from pure potatoes, which can be dehydrated, freeze-dried, and then pelletized. Other ways to make the granules 26 are possible, as known in the art. The container 18 can include approximately 1.25 oz. to 1.5 oz. of granules, and preferably 1.5 oz. of granules. It will be understood by those skilled in the art that the present invention is not limited to any size granule 26 or container 18.

The dehydrated foodstuff in the container, in addition to comprising potatoes, can also include any one or more of the following: egg yolk, flour salt, xanthan gum, silicon dioxide, nutmeg oleo resin, black pepper, and turmeric oleo resin. The egg yolk is dehydrated. Although the foregoing is a preferred list of ingredients of the dehydrated potato, the present invention is not limited to any particular additive ingredients and other ingredients, such as flavoring, could be added or subtracted without departing from the spirit and scope of the invention.

It is noted that while the composition can include potato granules plus the additional ingredients, it is also possible to include the additional ingredients as part of the potato granules themselves. Thus, potato granules 26, after being produced, can be combined with egg yolk, flour salt, xanthan gum, silicon dioxide, nutmeg oleo resin, black pepper, and/or turmeric oleo resin. Also, potato granules 26 can be produced with the egg yolk, flour salt, xanthan gum, silicon dioxide, nutmeg oleo resin, black pepper, and/or turmeric oleo resin as part of the potato granules 26 themselves. The dehydrated foodstuff can include potato as well as any one, two, three, four, five, six, or all of the following: egg yolk, flour salt, xanthan gum, silicon dioxide, nutmeg oleo resin, black pepper, and/or turmeric oleo resin. Additionally, although the present invention prefers the use of potatoes, other edible substances can be used to replace the potato.

It is noted that the meaning of dehydrated means that there is reduced moisture, but this does not mean that a dehydrated foodstuff or dehydrated potato contains no moisture whatsoever. Rather, the moisture content can be low, as would be known by one of ordinary skill in the art, but not necessarily non-existent. All of the ingredients mentioned above are commercially available and further explanation is not necessary for an understanding of the present embodiment. However, additional information is provided in this regard.

The dehydrated potatoes are known in the art, and any standard dehydrated potatoes can be used as would be readily known by one of ordinary skill in the art. Preferably, the moisture content of the dehydrated potatoes is approximately 5-8%, by weight, and any range within this 5-8% range is appropriate. The dehydrated egg yolk is also known in the art, and any standard dehydrated egg yolk can be used as would be readily known by one of ordinary skill in the art. Preferably, the moisture content of the egg yolk is less than approximately three percent, by weight, but higher amounts of moisture can be included.

Figure 3:
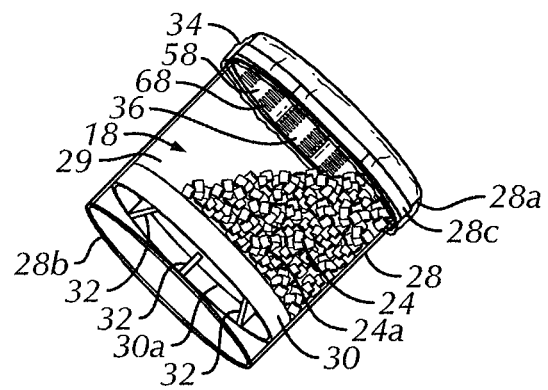
FIG. 3 is a side perspective view of the container shown in FIG. 2 tilted at an angle relative to the container shown in FIG. 2 to partially show the bottom of the container.

Referring to FIGS. 2 and 3, the container 18 includes a piston 30 complementarily positioned within the sidewall 28 at a first position proximate the first end 28b. The piston 30 is slideable with respect to the sidewall 28 (FIG. 2). The piston 30 is slideable with respect to the sidewall 28 such that the piston 30 may be urged toward the second end 28a of the sidewall to a second position. The piston 30 is preferably comprised of a polymeric material but may be comprised of any suitable material. The piston 30 preferably includes a plurality of support ribs 32 spaced around the periphery of the piston 30 such that an axially extending rim 30a (FIG. 3) is supported and prevents the piston 30 from tilting with respect to the sidewall 28.

The container 18 includes a removable cover 34 positioned proximate to the second end 28a (FIG. 2). The cover 34 can comprise a thin, flexible sheet. In the preferred embodiment, the cover 34 is comprised of a shrink wrapped film as known in the art. Alternatively, the cover 34 can comprise a film adhered to the container 18 which is not shrink-wrapped (not shown). For example, a film with an adhesive may be used as the cover 34. The cover 34 may be a flexible seal (not shown) which can be held to the sidewall by, for example, releasable epoxy or another adhesive. The cover 34 may be constructed of a high gloss aluminum foil though the cover 34 may be constructed of any suitable material. The cover 34 may include a pull tab (not shown) extending outwardly from the sidewall 28 such that a user may grasp the pull tab to remove the cover 34 from the container 18 prior to inserting the container 18 into the foodstuff dispensing machine 10. The cover 34 may also be a removably mounted lid (not shown). Also, the cover 34 may comprise both a film and a lid (not shown). The cover serves the purpose of insuring purity and avoiding contamination of the product.

Referring now to FIGS. 3 and 6A to 6C, a die plate 58 is provided proximate the second end 28a of the container 18. The die plate 58 is fixedly attached to the container 18. The die plate 58 is preferably co-molded into the second end 28a of the container 18. However, the die plate 58 may be mounted to the container 18 in any suitable manner such as spot welding, snap fit, compressing fit, through a plurality of fasteners or use of an epoxy. The die plate 58 includes one or more die openings 68. In the preferred embodiment, thirty-seven extrusion die openings 68 are provided through the die plate 58. However, the die plate 58 may contain any suitable number of die openings 68. The die openings 68 are preferably square in cross-section, but can be of any shape such as rectangular, circular or X-shaped.

Figure 12:
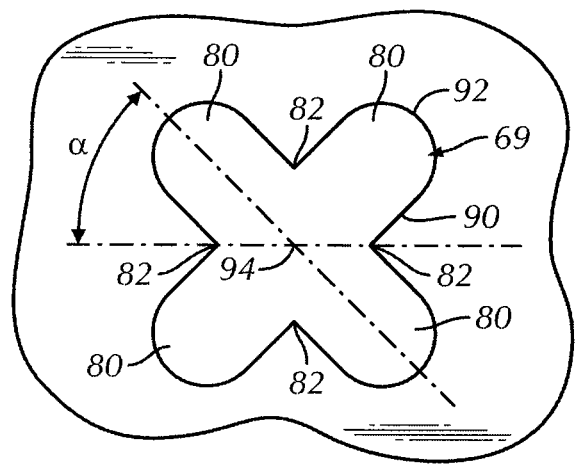
FIG. 12 is a plan view of a portion of a die plate having an X-shaped die opening in accordance with a second embodiment of the present invention.
Figure 13:
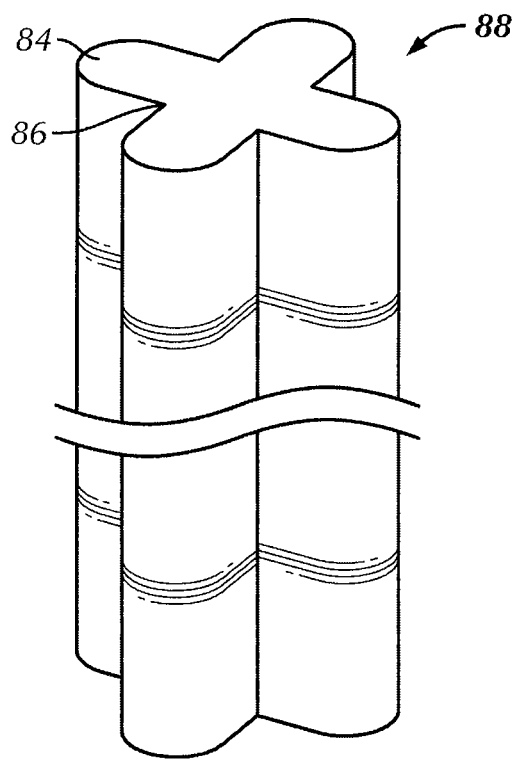
FIG. 13 is a perspective view of a potato strip produced in accordance with the second embodiment of the present invention.

Referring to FIGS. 12 and 13, the die openings 68 can also be X-shaped die openings 69. X-shaped die openings 69 are preferably used if quicker and more even cooking is desired than with square die openings 68. The container 18 is identical whether it has square die openings 68 or X-shaped die openings 69, except for the shape of the respective die openings. Thus, the number of die openings 69 (such as thirty-seven) and the spacing distribution of the die openings 69, is the same as an embodiment with square-shaped die openings 68. FIG. 12 shows a portion of a die plate 58 with an X-shaped die opening 69, which comprises protrusions 80 and indentations 82 between respective protrusions. Preferably, each die opening 69 comprises four protrusions 80 and four indentations 82. Preferably, the four protrusions 80 are approximately equally spaced and the four indentations 82 are approximately equally spaced. The protrusions 80 preferably have a straight portion 90 at the base of the protrusions 80 and a curved portion 92 at the end portions of the protrusions 80, although it is also possible for the protrusions 80 to only comprise curved portions 92. The intersection between respective adjacent protrusions 80 define respective indentations 82. Angle $\alpha$ is defined by two lines which intersect at the geometric center 94 of the die opening 69. One line extends to an intersection between adjacent protrusions 80, and the other line approximately bisects one of the adjacent protrusions 80. Angle $\alpha$ is preferably approximately 45 degrees. Preferably, all four protrusions 80 are approximately the same shape and all four indentations 82 are approximately the same shape.

Potato strips 88 made using containers 18 with X-shaped die openings 69 will have cross-sectional areas having approximately the same shapes as those of the die openings 69. For example, those potato strips 88 will have longitudinal protrusions 84 which correspond to the protrusions 80 and longitudinal indentations 86 which correspond to indentations 82.

The sidewall 28, the piston 30, and/or the die plate 58 are constructed of a high strength light weight material, such as a polymeric material. However, other materials can be used, such as metal, without departing from the spirit and scope of the invention.

The container or the die plate may include an outwardly extending flange 28c. The flange 28c extends radially outwardly from the sidewall 28 and is preferably octagon shaped (FIG. 6C) and positioned proximate the second end 28a of the container 18. However, the flange 28c may have any shape such as cylindrical or square and be positioned anywhere along the sidewall 28. The flange 28c can be made of a polymeric material or metal. The cover 34 may be designed to cover only the die openings 68, as well as the die openings 68 and the flange 28c. Preferably, the cover 34 is a shrink wrap layer which extends at least from the die openings 68 past the flange 28c (FIG. 2).

The container 18 can further include a water soluble film 36 (FIG. 3), positioned between the dehydrated foodstuff 24 and the die plate 58 to keep the dehydrated foodstuff from prematurely passing through the die openings 68. The water soluble film 36 covers each die opening 68 formed in the die plate 58. The water soluble film 36, can be made of, for example, rice paper. However, other edible water-soluble materials known in the art can be used. Additionally, the water soluble film 36 can comprise one or more flavors and can therefore serve as a flavor film. The rice paper may be attached by using water to activate the water soluble film 36 to adhere to either the die plate 58 or the container 18. For example, 4-drops of water equally spaced around the outside diameter (i.e., 90 degrees apart circumferentially) of the rice paper can be used to adhere the rice paper to the container 18 or to the die plate 58. The addition of small quantities of water to the water soluble film 36 can make the water soluble film 36 sticky and adhere to the die plate 58 or to the container 18.

During assembly, the die plate 58 may be co-molded to the sidewall 28. The water-soluble film 36 can then be applied to the inside of the die plate 58 or to the inside of the container 18 and then the cover 34 can be attached to the second end 28a of the container 18 to cover one side of the die plate 58. The granules 26 are then added to the container 18 through the first end 28b of the container 18 and then the piston 30 is inserted into the first end 28b of the container 18. The granules 26 are held between the water soluble film 36 and the piston 30. The water soluble film 36 and the cover 34 prevent the granules 26 from falling through the die openings 68 of the die plate 58, as mentioned above. Other ways to make the container 18 are also possible, such as fabricating the sidewall 28, applying the water soluble film 36 to either the sidewall 28 or to the die plate 58, and then attaching the die plate 58, followed by attachment of the cover 34, the addition of the granules 26, and the insertion of the piston 30.

Figure 9:
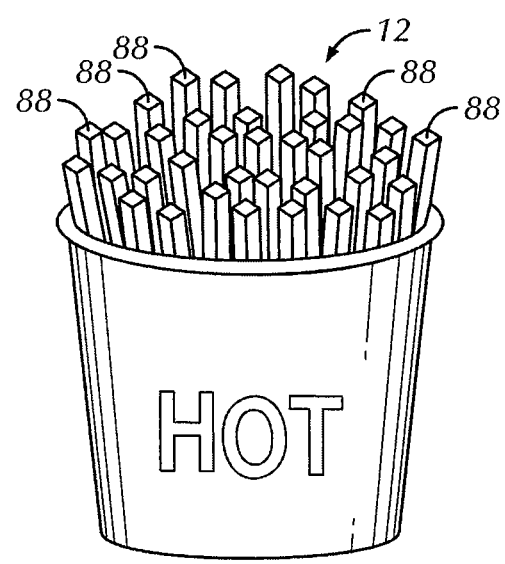
FIG. 9 is a front perspective view of a dispensing cup containing an individually prepared serving of potato strips dispensed from the foodstuff dispensing machine of FIG. 1.

Referring now to FIG. 1, there is shown a foodstuff machine 10 for extruding and cooking a hydrated foodstuff mixture 54 from the container 18. The foodstuff dispensing machine 10 dispenses an individually prepared serving 12 of cooked potato strips 88 (FIG. 9) at serving opening 16 during each cycle in accordance with the present invention. The foodstuff dispensing machine 10 has an outer protective housing 10a that is preferably positioned on a counter-top surface 14, similar to other dispensing machines such as "slushy" machines, milk shake machines, coffee machines and other similar automated foodstuff machines typically found in convenience stores. However, other positions are also possible. The foodstuff dispensing machine 10 is used in conjunction with individually inserted dehydrated foodstuff containers 18, which are described above. The containers 18 preferably extend from a storage bin 20 positioned in the bottom half of the housing 10a. The storage bin 20 is preferably removably mounted to the housing 10a and is comprised of a lightweight and shock absorbing substance such as a polystyrene foam material. The containers 18 are preferably at least partially exposed from the storage bin 20 to allow a user to grasp a container 18 and pull the container 18 from the storage bin 20. Alternatively, the containers 18 may be shipped separately from a display case (not shown), placed directly on a shelf (not shown) or counter-top surface 14, or kept behind a door within the foodstuff dispensing machine 10. A stack of dispensing cups 22 are also preferably provided by the foodstuff dispensing machine 10 in a holster 22a on the side of the dispending machine 10 similar to a water cooler. However, the dispensing cups 22 may be provided anywhere such as on the counter-top surface 14 or in a spring actuated dispenser (not shown) similar to those used for fountain soda drinking cups. Alternatively, the dispensing cups 22 may be provided within the foodstuff dispending machine 10 and automatically dispensed into the opening 16 after each cycle. Because the foodstuff machine 10 is preferably used inside a store, there is a reduced concern over stolen cups 22 and containers 18 as compared to a vending machine that is left unsupervised. Providing the dispensing cups 22 and containers 18 on the outside of the machine 10 reduces automated steps and components to thereby reduce the cost and size of the foodstuff dispensing machine 10 as compared to a vending machine.

The housing 10a which has an access opening 11 for receiving a container 18 having dehydrated foodstuff 24 therein. A housing opening cover, such as a hinged door 44, can be opened to insert container 18 into the housing 10a. The housing opening cover can be any type of cover, such as a sliding door. Thus, the container 18 with the dehydrated foodstuff 24 therein is inserted into the access opening 11 with the second end 28a facing the door 44 and then the door 44 is closed. A display 42 (FIG. 1) can optionally be included to the front of the housing 10a. The display 42 can have a digital screen with instructions as well as a step by step account of the procedure. The display can be located on the top left portion of the unit or in another portion of the housing 10a.

Figure 5:
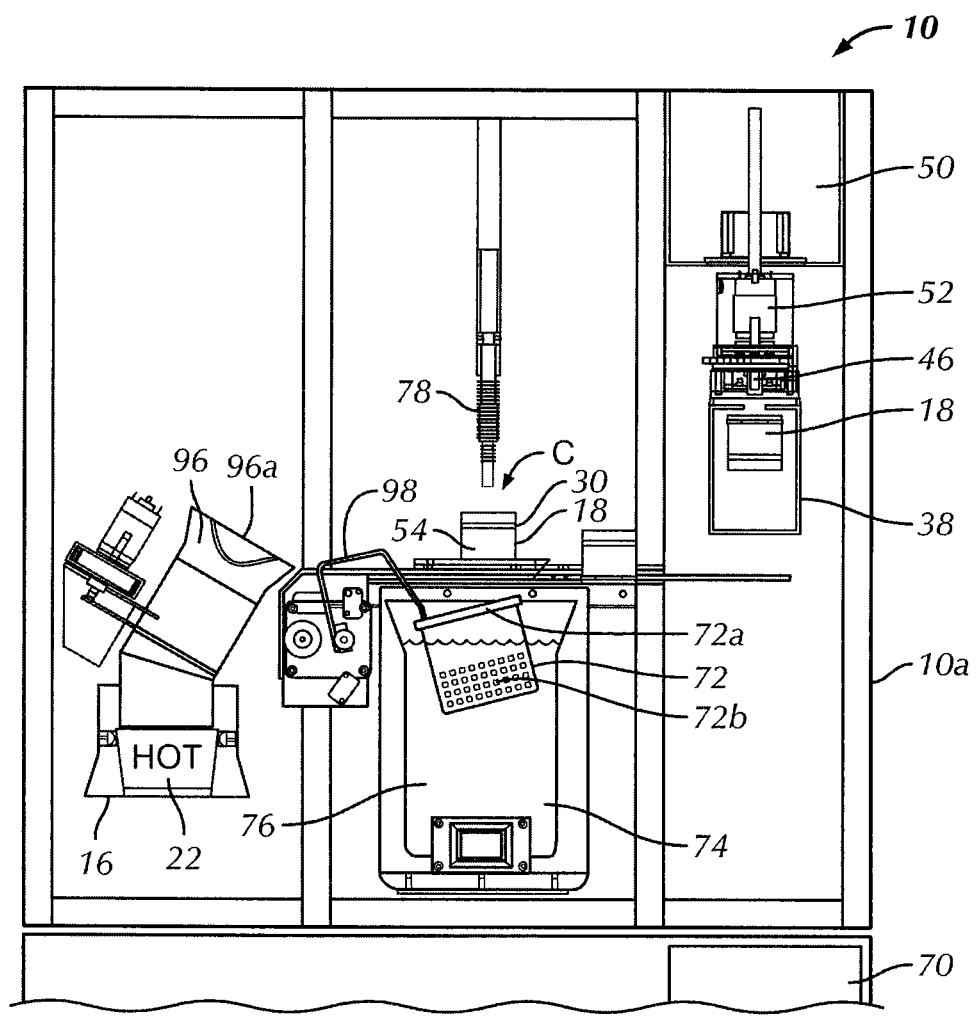
FIG. 5 is a schematic front elevational view of an interior of a top portion of the foodstuff dispensing machine shown in FIG. 1.
Figure 10:
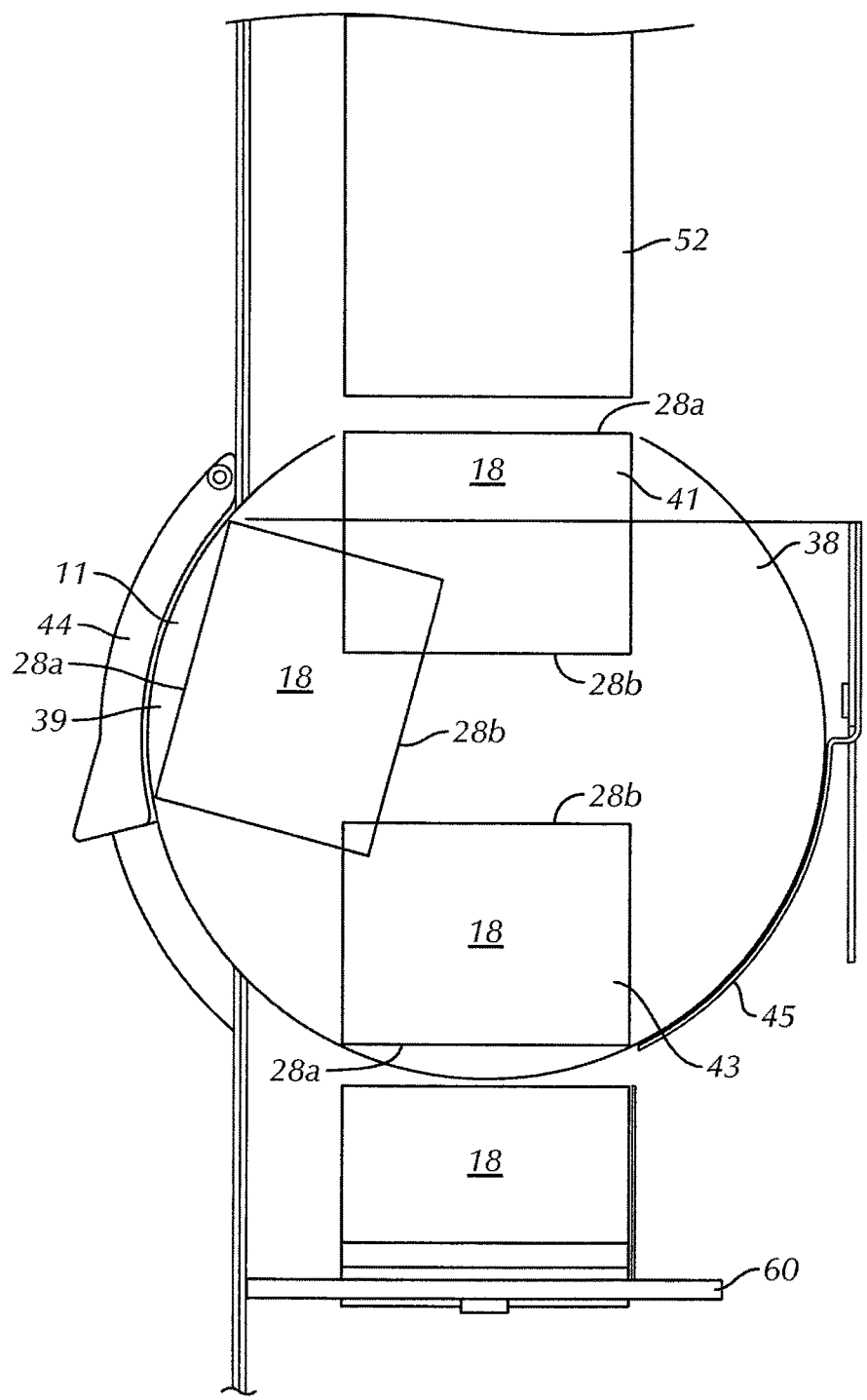
FIG. 10 is a schematic side view of a rotatable carriage for moving the container from a loading position, to a transfer position.

Referring now to FIGS. 1, 5 and 10, once the container 18 is inserted in the access opening 11, it is located within a hydrating and positioning system 38 which moves the container 18 from a loading position 39 (FIG. 10) when the container is in the access opening 11 to a hydrating position 41 with the container second end 28a above the first end 28b and then to a transfer position 43 where the first end 28b is positioned above the second end 28a. The hydrating and positioning system is preferably in the form of a rotatable carriage 38. Each container 18 is mounted to rotatably move with respect to the rotatable carriage 38 in a manner similar to a passenger cage on a Ferris Wheel.

The rotatable carriage 38 can rotate 360 degrees to end up in the same position that it starts. That is, the rotatable carriage 38 moves from the loading position 39 to the hydrating position 41 to the transfer position 43 and back to the loading position 39 (FIG. 10). The rotatable carriage 38 includes a cam, in the form of a guide surface 45, which contacts the container 18 to invert the container 18 as it moves from the hydrating position 41 to the transfer position 43 (FIG. 10). Without the guide 45, the container would fall out of the rotatable carriage 38 by the force of gravity. The guide 45 can take the shape a thin plate made of plastic or metal.

The foodstuff dispensing machine 10 also includes a liquid dispenser 46 (FIG. 5) positioned above the container 18 when the container 18 is in the hydrating position 41. The liquid dispenser 46 is part of a water dispensing system 52 which also includes a water storage container 50, described in more detail hereinafter.

Figure 7:
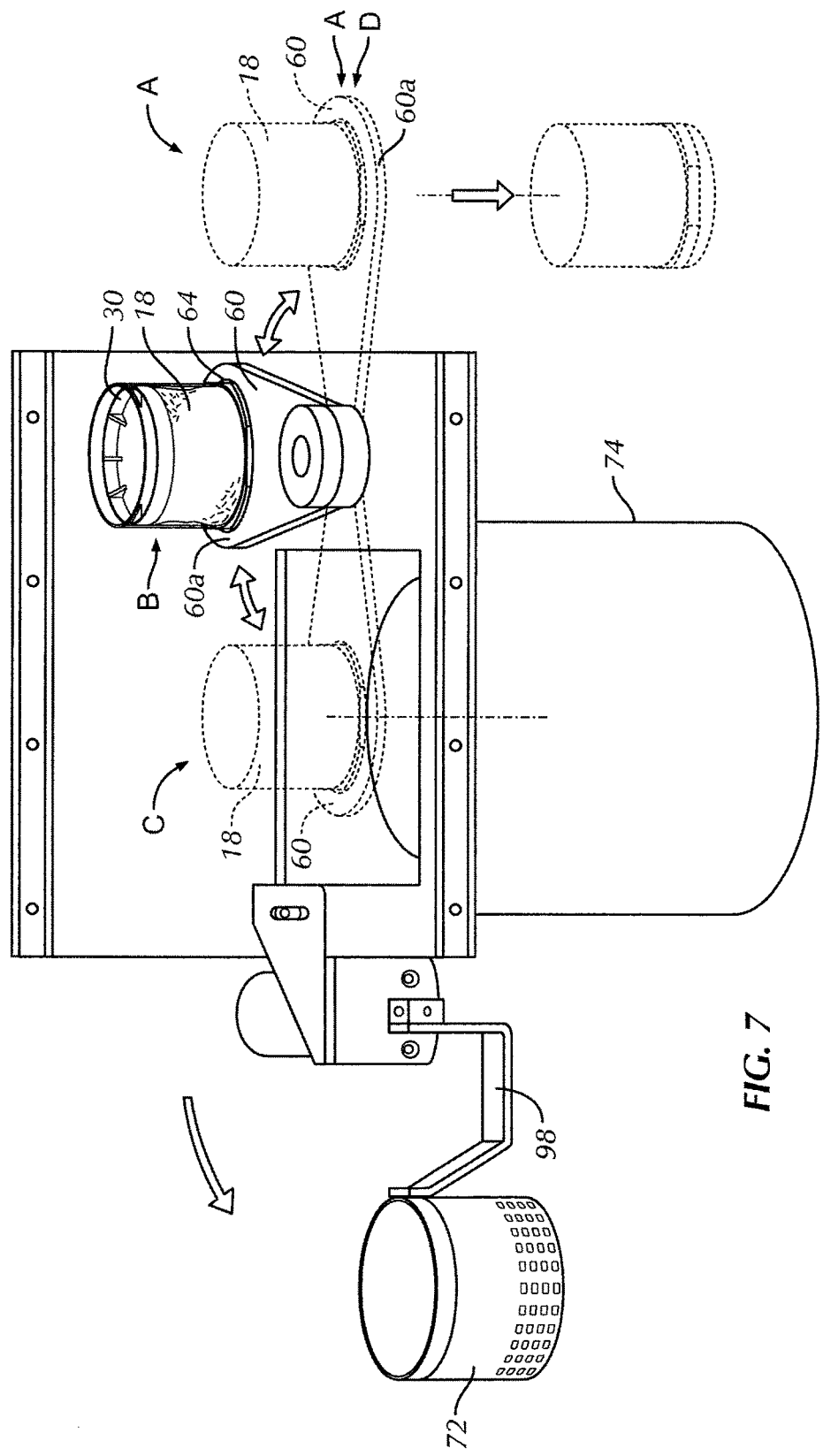
FIG. 7 is a schematic side perspective view of the transfer arm in an intermediate position between transfer and extruding positions shown in phantom and a cooking basket shown rotatably connected to a pivot arm.
Figure 8:
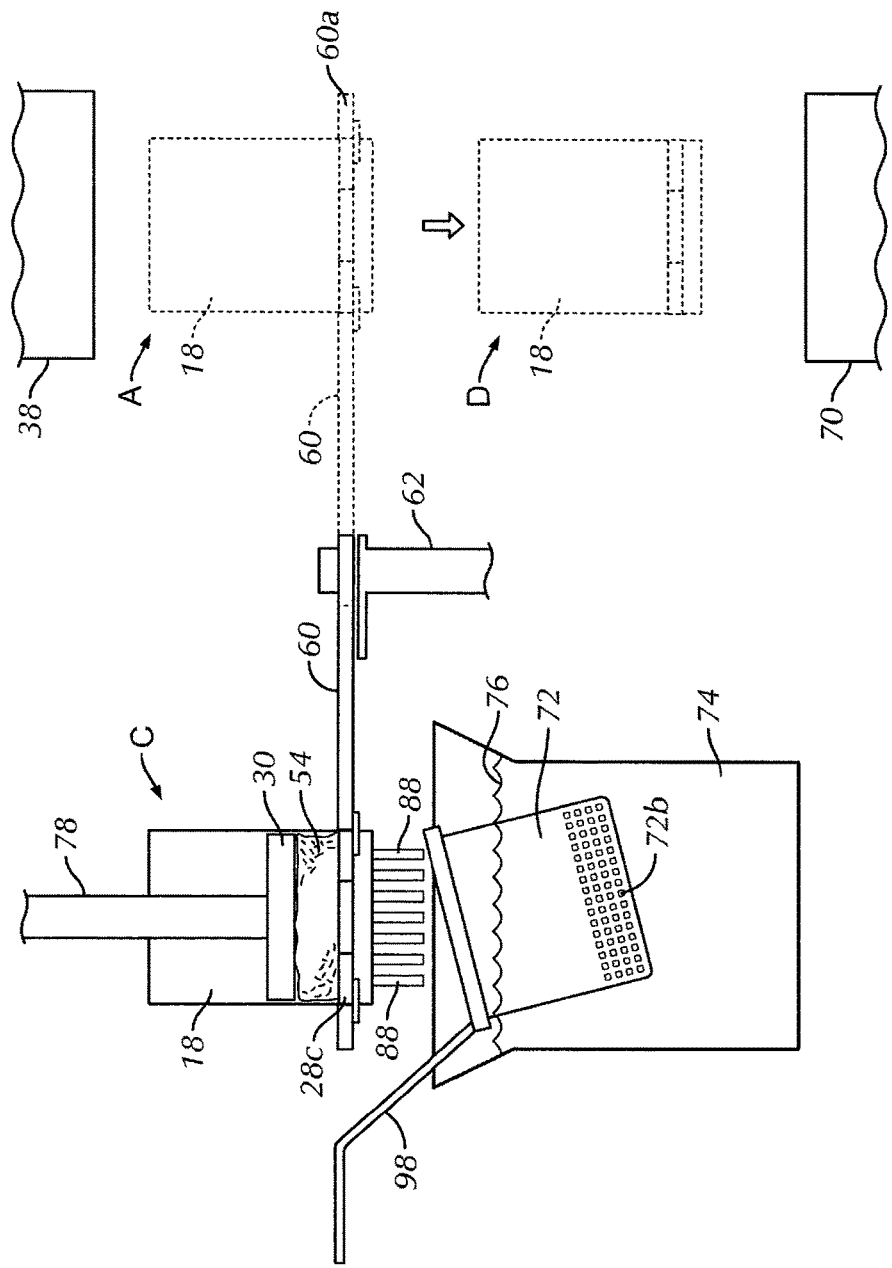
FIG. 8 is a schematic side elevational view of a piston urging an insert of the container downwardly to extrude the foodstuff mixture through the die plate in the container shown in FIG. 6B.

Referring now to FIGS. 7 and 8, the foodstuff dispensing machine 10 also includes a transfer arm 60 having an operative end 60a for receiving the container 18 and being movable from a first position A that supports the container 18 with the first end 28b facing upwardly to an extrusion position C via intermediate position B. From extrusion position C, the transfer arm can 60 moves to a discarding position D, which is preferably the same as first position A. The transfer arm 60 is preferably pivotally mounted on a support arm 62 in a cantilever fashion.

Figure 11A:
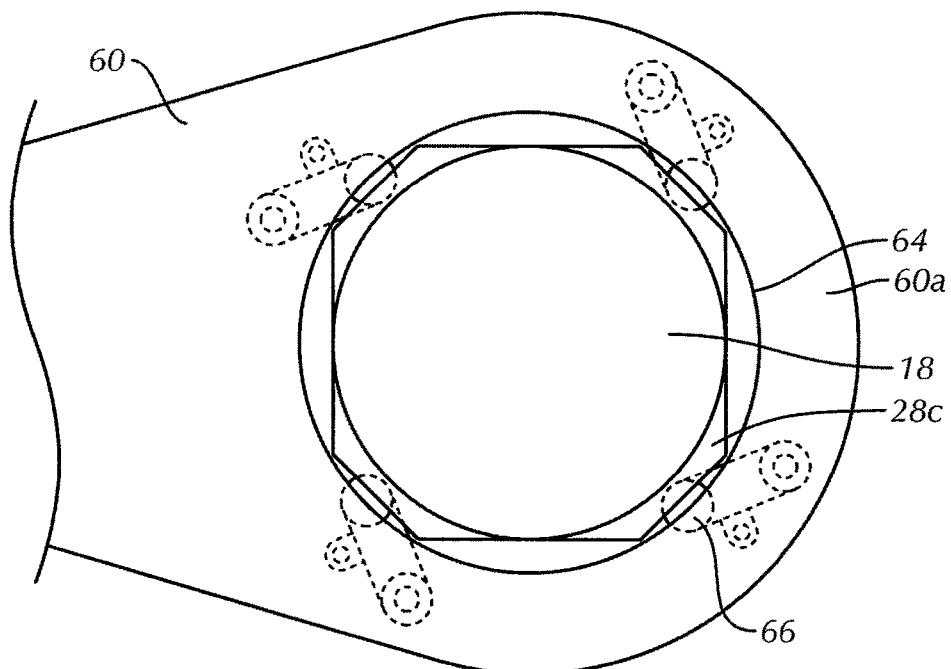
FIG. 11A is a schematic top view of a container being supported by a portion of the transfer arm.
Figure 11B:
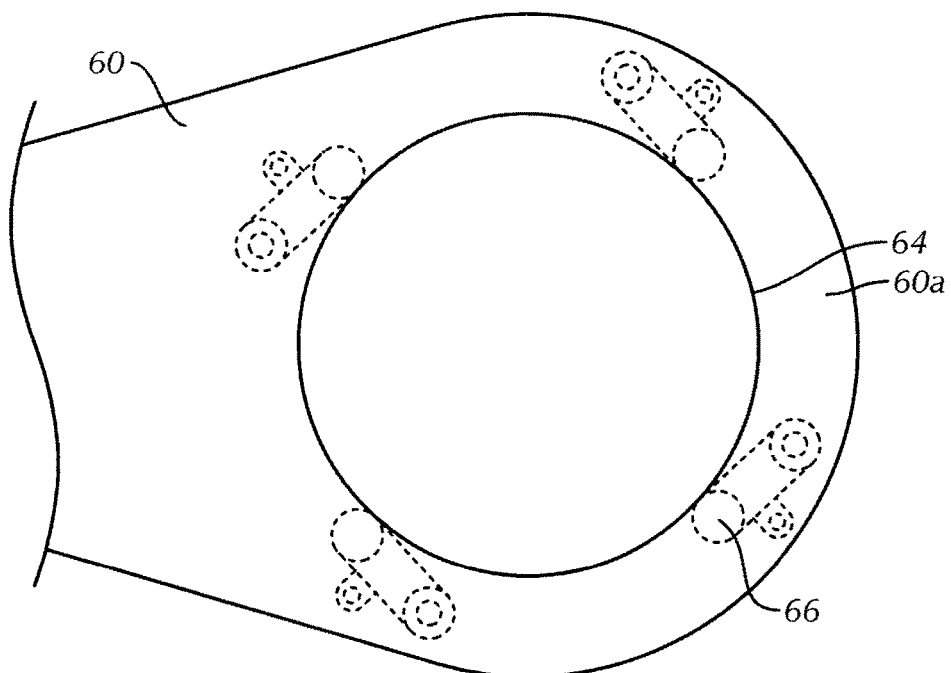
FIG. 11B is a schematic top view of a portion of the transfer arm with retracted cams for permitting a container to fall through the opening of the transfer arm.

As shown in FIG. 11A, the transfer arm 60 has an opening 64 which is large enough for the container 18 to pass through. However, support cams 66 protrude from the transfer arm 60 into the opening 64 to abut against the flange 28c of the container 18 and thereby support the container 18 and keep it from passing through the opening 64. The foodstuff dispensing machine 10 has the capability to retract the support cams 66 to permit the container 18 to drop through the opening 64, as shown in FIG. 11B. The mechanism for operation of the support cams 66 is a ring (not shown) which rotates to move the support cams 66. However, other ways to move the support cams 66 can be used as known by one of ordinary skill in the art.

Referring now to FIGS. 5, 7 and 8, in the extrusion position C, the container 18 is located over a cooking station, which comprises, for example, a pot 74. The pot 74 includes hot cooking liquid inside, such as hot oil 76. A basket 72 is positioned in the pot 74 for receiving the uncooked potato strips 88 and for retaining the potato strips 88 therein until cooked to a desired consistency.

A piston rod 78 operatively associated with the piston 30 in the container 18 is movable to force the piston 30 toward the second end 28a of the container 18 to force hydrated foodstuff 54 (FIGS. 6B, 8) through the die openings 68 to form uncooked potato strips 88 which drop into the basket 72, which is mostly submerged in the oil 76. A pivot arm 98 is secured to the basket 72 and lifts the basket 72 from the pot 74 when the potato strips 88 have attained the desired consistency, which occurs after a predetermined time. When the predetermined amount of cooking time has elapsed, the cooking basket 72 is raised from the cooking position (FIG. 5) within the cooking pot 74 by a pivot arm 98. The cooking liquid 76, such as oil, within the cooking basket 72 drains out of the cooking basket 72 through one or more drainage holes 72b (FIG. 8) in the cooking basket. The cooking basket 72 is preferably maintained above the cooking pot 74 for a period of time such as three seconds in order to permit the unabsorbed cooking oil 76 to drip from the cooking basket 72 and the potato strips 88. Additionally, the pause may allow for the potato strips 88 to cool to a desired temperature. A blower (not shown) may be used to release a blast of air to expedite the draining of the cooking oil 76 from the cooking basket 72 or to blow any remaining cooking oil 76 off the cooking basket 72 and potato strips 88.

In use, a plurality of containers 18 containing dehydrated foodstuff 24 are provided on the machine 10 or nearby. A container 18 is selected from the plurality of containers 18. The removable cover 34 is removed from an outside of the container 18. The cover 34 may be disposed of in a slot 10b in foodstuff dispensing machine 10. The container 18 is placed inside the housing 10a of the foodstuff machine 10, which is configured to receive the container 18. The machine 10 is configured to receive the container 18 only in one direction. Thus, it cannot be inserted upside down. That is, the rotatable carriage 38 is shaped to only receive the container 18 with the first side 28b facing in and the second side 28a facing out of the housing 10a. Moreover, the tolerance of the shape of the rotatable carriage 38 is such that even if the container 18 has the shrink wrap cover 34 on it, it will not be able to be inserted into the housing 10a. This ensures that the shrink wrap cover 38 will be removed before inserting the container 18 into the housing 10a.

When a user desires an order of individually prepared serving of foodstuff 12, the user follows the instructions provided on a display 42 on the foodstuff dispensing machine 10 or are otherwise provided, such as on the container 18. The user then selects a container 18, removes the container 18 from the storage bin 20 (or otherwise obtains the container from a different accessible location such as a countertop) and removes the cover 34 from the container 18. The housing 10a may have a slot 10b for receiving the removed cover 34. It is also possible to have an automatic storage bin 20 which will select a container 18 for the user to utilize with the machine 10.

To insert the container 18 into the housing 10a, a user will lift the door 44 and hold the door 44 open while inserting the container 18 into the housing 10a. Once the container 18 is in place inside the housing 10a, the customer can release the door 44 which will drop by gravity to close the access opening 11 of the housing 10a (FIG. 1). When the container 18 is inserted into the housing 10a, it will be at an angle compared to horizontal (FIG. 10). The angle may be approximately fifteen degrees from the horizontal, although other angles are possible. In FIG. 10, loading position 39 is where the container 18 will be loaded into the positioning system, which is shown as a rotatable carriage 38 in FIG. 10. A sensing device (not shown) will sense that the door 44 is closed and a second sensing device (not shown) will sense that a container 18 is inside the housing 10a and this will begin the process of the foodstuff dispensing machine 10.

Figure 6A:
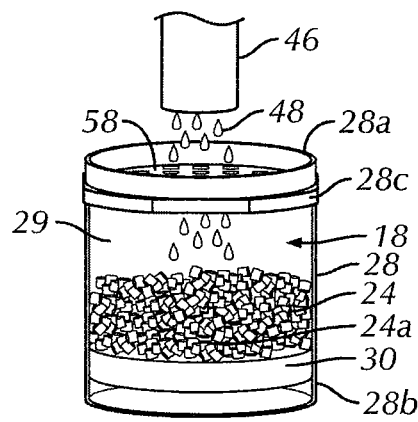
FIG. 6A is a side perspective view of a container of FIG. 2 without a cover and a liquid dispenser of the foodstuff dispensing machine shown in FIG. 1.
Figure 6B:
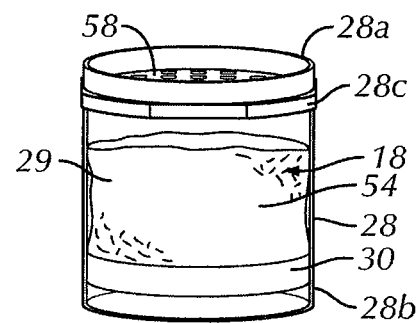
FIG. 6B is a side perspective view of the container shown in FIG. 6A containing a re-hydrated foodstuff mixture.
Figure 6C:
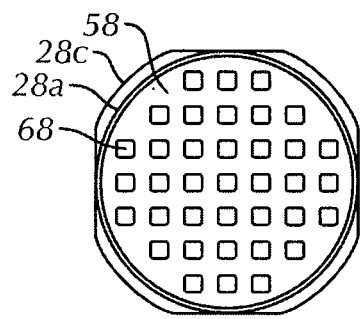
FIG. 6C is a top plan view of the container shown in FIG. 6A.
Figure 6D:
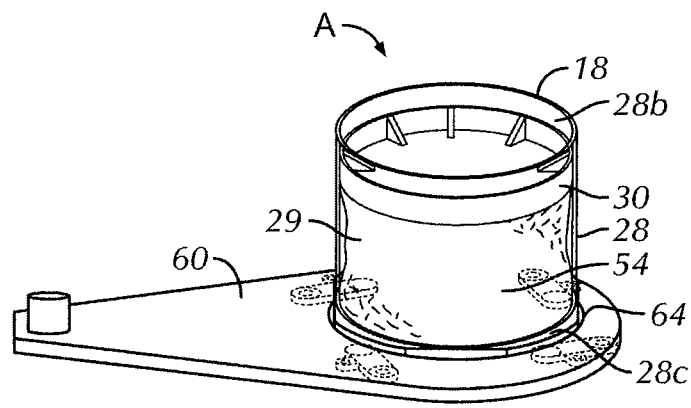
FIG. 6D is a side perspective view of the container and foodstuff mixture shown in FIG. 6B being held by a transfer arm in an inverted position.
Figure 6E:
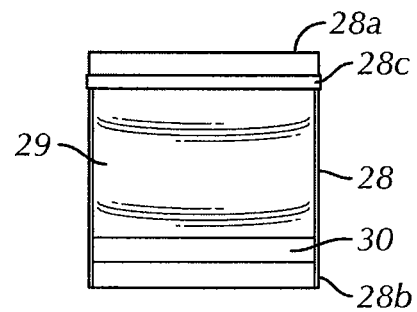
FIG. 6E is a side elevational view of the container without a lid.
Figure 6F:
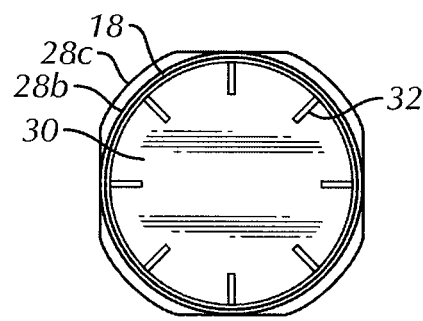
FIG. 6F is a bottom view of the container shown in FIG. 2.

This process involves activating a mechanism to move the container 18 to a hydration position 41 and adding liquid, such as water 48 (FIG. 6A) to the dehydrated foodstuff 24 to form a hydrated foodstuff mixture 54 (which is semi-solid in texture) in the container 18 (FIG. 6B). As explained above, the movement of container 18 to a hydration position 41 is attained with a rotatable carriage 38, which may be in the form of a pin wheel. The movement of the container 18 from a loading position 39 to a transfer position 41 involves a clockwise movement of the rotatable carriage 38 (see FIG. 10) of approximately 75 degrees. This will place the potato container 18 and the water dispensing system 52 in perfect vertical alignment. The water dispensing system 52 can be mounted from the top of the unit (FIG. 5). The water dispensing system will release 225 milliliters of water through five (5) miniature valves (not shown). Other amounts of water can be released depending on the type and amount of dehydrated foodstuff present in the container 18. This water is heated to 120 degrees Fahrenheit. However, other temperatures are also possible. The potatoes will hydrate instantly, absorbing all the heated water, and transform into a warm mash consistency. This mash will have the body and texture to be extruded into thirty-seven potato strips 88 that will hold their shape and not break apart during extrusion or transport.

The hydration of the dehydrated foodstuff 24 will provide a semi-solid mixture which is a hydrated foodstuff mixture 54. The adding of water 48 (or other liquid) dissolves, at least partially (preferably completely), the water-soluble film 36 attached to the container 18 and forms a hydrated foodstuff mixture 54 which includes the water 48, the foodstuff, and the dissolved water-soluble film 36. Essentially all of the dehydrated foodstuff 24 must be moistened for the extrusion and cooking to be successful. Too much water 48 will create a loose slurry that will not have the ability to be extruded. Too little water 48 creates dry spots that will break-apart in the extrusion process and turn black in color when placed in cooking oil 76. Physically mixing the dehydrated foodstuff 24 with the water 48 adds expense to the machine, slows down the process and requires regular cleaning and potential sanitation code problems if foodstuff were to remain on the machine parts. The granules 26 are preferred over other dehydrated foodstuff forms such as flakes and power because mixing is not required and because the granules roll over each other during shipping and handling of the containers 18 to prevent the dehydrated foodstuff 24 from breaking up into powder form.

When the container 18 is in the hydration position 41, the liquid dispenser 46 is positioned over the container 18 in order to dispense water 48 into the container 18. Preferably, there is no need to raise or lower liquid dispenser 46, but this may be done, in order to be in an appropriate position to dispense water 48. The liquid dispenser 46 releases a measured amount of water 48 (or other liquid) into the container 18 (FIG. 6A) preferably by the use of five nozzles (not shown), each of which directs the water 48 to a separate die opening 68. However, drops or a spray can be used and the number of nozzles can be more or less than five. The water 48 enters the container 18 through the die openings 68. The advantage of using a plurality of nozzles (not shown), is that the water 48 enters through one or more die openings 48, rather than being sprayed or otherwise deposited on the die plate 58 as well as through the die openings 48. Thus, five streams of water 48 may enter five different die openings 68.

The shape of the flange 28c and guides (not sown) inside the rotatable carriage ensure that the container 18 is aligned with the liquid dispenser 46, especially if a plurality of nozzles are utilized, where each nozzle is aligned with or otherwise corresponds to a particular die opening 68. The water 48 may be replaced by other suitable liquids such as milk. The water 48 is released from a water storage container 50, and the amount is controlled as known by those skilled in the art. Preferably, 125 milliliters of water at about 120 degrees Fahrenheit is dispensed per cycle. The temperature is carefully controlled by conventional heating devices as understood by those skilled in the art. Preferably, no additional mixing of the mixture 54 is required as the granules 26 provide a matrix of air spaces 24a (FIG. 2) that allow the water 48 to defuse between each granule 26 and quickly wet all or essentially all of the dehydrated foodstuff 24 on contact. The mixture 54 expands within the container 18. The liquid dispenser 46, while preferably stationary, can be raised vertically upwardly away from the container 18 after dispensing water 48.

After the addition of the water 48, the rotatable carriage 38 will rotate 180 degrees clock-wise (FIG. 10). This movement will rotate the potato container 18 from a position where the die plate 58 faces up to the liquid dispenser 46 to where the die plate 58 faces down towards the transfer arm 60 and away from the liquid dispenser 46. The guide 45 inverts the container 18 and keeps it in the rotary housing until it reaches the gravity drop position which is in vertical alignment with transfer arm 60. Once this position is reached, the inverted potato container 18 will drop 1.5 inches, aided by guides (not shown) in the rotatable carriage 38, onto the transfer arm 60.

Referring to FIGS. 7 and 8, the transfer arm 60 will move, along with container 18, 180 degrees counter-clockwise, when viewed from the top, to be in vertical alignment with the pot 74. The pot 74 may be preheated to 380 degrees F. At this time, the basket 72, which is in contact with cooking liquid 76, will rise from its submerged position in the oil 76, to approach the die plate 58. The basket 72 will therefore begin submerged in the oil and then rise to be partially outside and partially inside (primarily inside) the oil 76. The basket 72 is vertically aligned with the die plate 58. Then, piston rod 78 will engage the piston 30 inside the container 18. At this time, the mixture 54 is still clinging to the inside circumference of the container 18 and the inside face of the piston 30. The hydration has created an air tight seal between the two parts. When the piston rod 78 engages the piston 30, this will cause the piston 30 to move downward, which will cause the mixture 54 to move forward. Once the mixture 54 has reached die plate 58, the mixture 54 will be forced through the die openings 68 to form potato strips 88 which conform to the shape of the die openings 68. The die plate 58 is fixedly attached to the container 18, as explained above, and is therefore disposable and there is no need to clean it after each use or at all.

The shape of the potato strips 88 is preferably symmetrical since they have been designed to cook evenly through uniformity. The configuration of the die openings is that of 0.25 inch squares with a 0.015 inch radius in each corner. Upon extrusion, the potato strips 88 fall into the cooking basket 72 and are cooked to form cooked potato strips 88. The basket 72 has sleeves (not shown) which are in vertical alignment with respective die openings 68. For example, 37 sleeves will be in alignment with the 37 die openings. When the potato is extruded, individual potato strips 88 can fall into individual sleeves. This helps avoid clumping of the potato strips 88 and helps obtain uniform cooking. When the piston 30 has traveled essentially the entire length of the container 18, essentially all of the mixture 54 will be expelled, although a portion of the mixture 54 will remain within the die openings 68. The length of the potato strips 88 depends on the amount of foodstuff mixture 54 provided within the container 18. Alternatively, the piston 30 may include a plurality of projections (not shown) that extend toward the die plate 58 and fit within the die openings 68 such that the projections extend through the die openings 68 when the insert is urged against the die plate 58 to remove mixture 54 remaining in the die openings 68. Once the extrusion is complete, the piston rod 78 will move back up away from the container 18. Additionally, the transfer arm 60 will pivot back to a position below the rotatable carriage 38 and this pivoting position will sheer off any hanging potato strips 88 into individual sleeves which the potato strips 88 are already at least partially occupying. Then, the basket 72 is then lowered back into the cooking oil 76, which will cause mild turbulence due to the hot cooking oil 76 expelling water contained within the potato strips 88. This turbulence also aids in freeing the strips 88 from the inside surfaces of the basket 72. The inside surfaces of the basket 72 can be chemically finished using electrolous nickel which provides an ultra smooth, ultra hard, ultra sanitary cooking surface. Other coatings known in the art can also be utilized. The cooking basket 72 has an open top 72a that is spaced above the cooking oil 76 by 0.5 inches and extends four inches into the cooking oil 76 during the cooking. The cooking basket 72 is preferably comprised of stainless steel. The cooking oil 76 is preferably maintained in a ready cooking state at a high temperature, such as 375 degrees Fahrenheit at all times in order to permit immediate cooking of the potato strips 88 within the cooking basket 72.

A micro processor control system (not shown) is used to perform various steps. For example, it will return the rotatable carriage 38 to the loading position 39 and return the transfer arm 60 with the empty container 18 to its position below the rotatable carriage 18. At this location, a pin (not shown) will be tripped, the pin being located on a drop ring (not shown) which will cause the drop ring to rotate, preferably 6 degrees counter-clockwise. This movement will cause the four (4) support cams 66, which are supporting the empty container 18, to extract, and this extraction will remove the support cams 66 from underneath the empty container 18, thus allowing the empty container 18 to drop down an exit chute (not shown) into a waste container 70 (FIG. 8). The waste container 70 preferably includes a handle 70a for opening or removing the waste container 70 (FIG. 1). The used containers 18 are occasionally emptied from the waste container 70 and are preferably recycled. The waste container 70 may include a sensor (not shown) that alerts an employee such as through a blinking light (not shown) or on the display 42 that the waste drawer 70 needs to be emptied.

During the cooking, the display 42 will instruct the customer to place a cup 22 in the dispensing opening 16 to receive the cooked potato strips 88.

The potato strips 88 will cook for, preferably, 28 seconds in, preferably, 100% rice oil. The cooking temperature will be, preferably, a maximum of 375 degrees Fahrenheit. There are three electronic control devices which monitor the temperature of the oil 76. Each monitor has the control feature to shut-off power to the pot 74 heating elements should a variation arise. The cooking time is predetermined and can depend on such factors as the size and type of the foodstuff to be cooked and the temperature of the cooking oil 76 within the cooking pot 74.

Then, the cooked strips 88 are removed from the cooking station 74 and from inside of the housing 10*a*. This is done by lifting the basket 72 from the pot 74 with pivot arm 98 and rotating in an upward arc until the basket 72 reaches preferably about 30 degrees from a horizontal direction. At this location, the basket 72 stops, resting above the cooking station 74. This allows the excess cooking oil 48 to drain from the potato strips 88 via drainage holes 72*b* as well from the basket 72 back into the pot 74. Also, it allows the freshly cooked strips 88 to cool a moment before serving. As mentioned above, a blower (not shown) may be used to release a blast of air to expedite the draining of the cooking oil 76 from the cooking basket 72 or to blow any remaining cooking oil 76 off the cooking basket 72 and potato strips 88. The basket 72 will remain in this position for three (3) seconds. Then, the basket 72 is rotated to be aligned with a funnel opening 96*a*. The basket is rotatably connected to the pivot arm 98 such that the open top 72*a* of the basket faces up all the time by operation of gravity.

The bottom of the basket 72 has two doors (not shown) which comprise or are operatively connected to respective lever arms with dutch bends which maintain the doors closed by operation of gravity and restrict the cooked strips 88 ("fries") from falling. The lever arms are positioned in a cantilever fashion with respect to the basket 72. As the basket 72 descends towards the funnel 96, a mechanical stop engages the lever arms to force the doors to rotate 90 degrees to the open position, allowing the fries 88 to free fall into the funnel 96. The micro processor then controls the pivot arm 98 to lift the basket 72 and rotate it back to its home position (submerged inside the pot 74). As the basket 72 is lifted to return to its home position, the mechanical stop is removed and the lever arms will return the doors to the closed position by operation of gravity. Other methods of opening and closing doors at the bottom of the basket 72 can be employed, such as spring loaded doors as known in the art.

The bottom of the funnel 96 is sealed by a circular trap door (not shown) which restricts an entrance to the foodstuff dispensing machine 10 from outside the foodstuff dispensing machine 10. This trap door has a dual function, in addition to denying entrance, it is the holding chamber for the fries prior to releasing into the dispenser cup 22. At this time, the micro processor causes the trap door to slide 90 degrees clock wise, allowing the fries to drop into the dispenser cup. The trap door, which is engaged to a spring loaded mechanism (not shown), returns to its closed position once the fries 88 have dropped. If the dispensing cup 22 is not placed within the opening 16, the display 42 may flash and the foodstuff dispensing machine 10 may emit a sound to alert the user to insert the dispensing cup 22 within the opening 16 to prevent the potato strips 88 from falling into the opening 16 without the dispensing cup 22. The potato strips 88 are then dropped into the dispensing cup 22 and the user removes the dispensing cup 22 from the opening.

There may be residue that will accumulate on the surface of the trap, which can be sanitized by a use of an ultraviolet lamp located inside the funnel 96. This ultraviolet lamp is U.L. approved and will effectively destroy all types of bacteria.

The display 42 will then flash the information that the fries are in the dispensing opening 16. The customer takes the order of fries, and the cycle is completed.

Thus, the present invention permits the long-term storage of potato food which can be used later to prepare french fries in a machine that is simple to operate, compact, with little maintenance, and with reliably high-quality product being produced.

Further, to the extent that the method does not rely on the particular order of steps set forth herein, the particular order of the steps in the steps set forth in the preferred method of should not be construed as limitation on the claims. The claims directed to the method of the present invention should not be limited to the performance of their steps in the order written, and one skilled in the art can readily appreciate that the steps may be varied and still remain within the spirit and scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A foodstuff machine for hydrating, extruding and cooking foodstuff from a container, the container having a continuous sidewall with first and second ends forming a storage area and a piston complementarily positioned within the sidewall proximate the first end and being slidable with respect to the sidewall, the container including dehydrated foodstuff located in the storage area, the foodstuff machine comprising:
    a machine housing having an access opening for receiving a container having dehydrated foodstuff therein;
    a hydrating and positioning system movable from a loading position when the container is in the access opening to a hydrating position with the container second end above the first end and then to a transfer position wherein the first end is positioned above the second end;
    a liquid dispenser positioned above the container when the container is in the hydrating position;
    a transfer arm having an operative end for receiving the container and being movable from a first position that supports the container in the transfer position to an extrusion position wherein the container is located over a cooking station; and
    a piston rod operatively associated with the piston in the container and movable to force the piston toward the second end of the container to force hydrated foodstuff through a die to form uncooked strips which drop into the cooking station.

2. The foodstuff machine according to claim 1, wherein the hydrating and positioning system comprises a rotatable carriage.

3. The foodstuff machine according to claim 2, wherein the rotatable carriage moves 360 degrees from the loading position to the hydrating position to the transfer position and back to the loading position.

4. The foodstuff machine according to claim 2, wherein the hydrating and positioning system includes a cam which contacts the container to invert the container as it moves from the hydrating position to the transfer position.

5. The foodstuff machine according to claim 1, wherein the cooking station comprises:
    a pot of hot cooking liquid located below the container in the extrusion position; and
    a basket positioned in the pot and hot cooking liquid for receiving the uncooked strips and for retaining the strips therein until cooked to a desired consistency.

6. The foodstuff machine according to claim 5, further comprising a pivot arm secured to the basket lifting the basket from the pot when the strips have attained the desired consistency.

\* \* \* \* \*